United States Patent
Kyono

(10) Patent No.: US 8,385,094 B2
(45) Date of Patent: Feb. 26, 2013

(54) MULTIPLE-OUTPUT SWITCHING POWER SOURCE APPARATUS

(75) Inventor: Yoichi Kyono, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

(21) Appl. No.: 12/528,461

(22) PCT Filed: Feb. 27, 2008

(86) PCT No.: PCT/JP2008/053423
§ 371 (c)(1),
(2), (4) Date: Aug. 25, 2009

(87) PCT Pub. No.: WO2008/105465
PCT Pub. Date: Sep. 4, 2008

(65) Prior Publication Data
US 2010/0046251 A1 Feb. 25, 2010

(30) Foreign Application Priority Data

Feb. 28, 2007 (JP) .................................. 2007-050207

(51) Int. Cl.
*H02J 1/00* (2006.01)
(52) U.S. Cl. ........................................ 363/65; 363/21.02
(58) Field of Classification Search ............... 363/21.02, 363/17, 21.04, 21.06, 56.01, 56.02, 95, 16, 363/132
See application file for complete search history.

(56) References Cited

U.S. PATENT DOCUMENTS

| 5,761,055 A * | 6/1998 | Okada et al. ............... 363/56.08 |
| 6,297,976 B1 * | 10/2001 | Isono .............................. 363/65 |
| 6,822,881 B2 * | 11/2004 | Elferich ....................... 363/21.02 |
| 7,116,561 B2 * | 10/2006 | Osaka ........................... 363/21.02 |
| 7,315,460 B2 | 1/2008 | Kyono |
| 7,339,799 B2 | 3/2008 | Osaka et al. |
| 7,375,987 B2 | 5/2008 | Kyono |

(Continued)

FOREIGN PATENT DOCUMENTS

| JP | 4 21359 | 1/1992 |
| JP | 9 322533 | 12/1997 |

(Continued)

OTHER PUBLICATIONS

U.S. Appl. No. 12/667,973, filed Jan. 6, 2010, Kyono.

(Continued)

*Primary Examiner* — Nguyen Tran
(74) *Attorney, Agent, or Firm* — Oblon, Spivak, McClelland, Maier & Neustadt, L.L.P.

(57) ABSTRACT

A multiple-output switching power source apparatus has a series resonant circuit connected in parallel with a switch Q2 and including a primary winding and a current resonant capacitor, a first rectifying-smoothing circuit rectifying and smoothing a voltage of a secondary winding in an ON period of the switch to provide a voltage Vo1, a series resonant circuit connected in parallel with the switch and including a primary winding and a current resonant circuit, a second rectifying-smoothing circuit rectifying and smoothing a voltage of a secondary winding in the ON period of the switch Q2 to provide a voltage Vo2, and a control circuit controlling an ON period of a switch Q1 according to the output voltage Vo1 and the ON period of the switch Q2 according to the voltage Vo2 and limit the ON period of the switch Q1 if the voltage Vo2 exceeds a predetermined voltage.

5 Claims, 12 Drawing Sheets

U.S. PATENT DOCUMENTS

| | | | |
|---|---|---|---|
| 7,446,512 B2 * | 11/2008 | Nishihara et al. | 323/233 |
| 2004/0145923 A1 | 7/2004 | Van Bodegraven et al. | |
| 2007/0138870 A1 | 6/2007 | Kyono | |
| 2009/0256423 A1 | 10/2009 | Kyono | |

FOREIGN PATENT DOCUMENTS

| | | |
|---|---|---|
| JP | 2003 259644 | 9/2003 |
| JP | 2004 533198 | 10/2004 |

OTHER PUBLICATIONS

U.S. Appl. No. 12/663,290, filed Dec. 7, 2009, Kyono.
U.S. Appl. No. 12/442,824, filed Mar. 25, 2009, Kyono.
U.S. Appl. No. 12/990,390, filed Oct. 29, 2010, Kyono
U.S. Appl. No. 13/494,342, filed Jun. 12, 2012, Kyono.

* cited by examiner

MULTIPLE-OUTPUT SWITCHING POWER SOURCE APPARATUS

TECHNICAL FIELD

The present invention relates to a multiple-output switching power source apparatus having a plurality of outputs.

BACKGROUND TECHNOLOGY

FIG. 1 is a circuit diagram illustrating a configuration of a resonant-type multiple-output switching power source apparatus according to a related art. In this multiple-output switching power source apparatus, the primary side of a transformer T1 includes a full-wave rectifying circuit 2 to rectify an AC voltage from a commercial power source 1, a smoothing capacitor C3 connected between output terminals of the full-wave rectifying circuit 2, to smooth an output from the full-wave rectifying circuit 2, first and second switching elements Q1 and Q2 made of, for example, MOSFETs connected in series between both ends of the smoothing capacitor C3 and receiving a voltage across the smoothing capacitor C3 as a DC input voltage Vin, a control circuit 10 to control ON/OFF of the first and second switching elements Q1 and Q2, a voltage resonant capacitor Crv connected in parallel with the second switching element Q2, and a series resonant circuit connected to both ends of the voltage resonant capacitor Crv.

The series resonant circuit has a primary winding P1 (the number of turns of N1) of the transformer T1, a reactor Lr, and a current resonant capacitor Cri that are connected in series. The reactor Lr is, for example, a leakage inductance between the primary and secondary sides of the transformer T1.

The secondary side of the transformer T1 includes a first rectifying-smoothing circuit connected to a first secondary winding S1 (the number of turns of N2) wound to generate a voltage whose phase is opposite to the phase of a voltage generated by the primary winding P1 of the transformer T1 and a second rectifying-smoothing circuit connected to a second secondary winding S2 (the number of turns of N3) wound to generate a voltage whose phase is opposite to the phase of the voltage generated by the primary winding P1 of the transformer T1.

The first rectifying-smoothing circuit has a diode D1 and a smoothing capacitor C1, to rectify and smooth a voltage induced by the first secondary winding S1 of the transformer T1 and output a first output voltage Vo1 from a first output terminal. The second rectifying-smoothing circuit has a diode D2 and a smoothing capacitor C2, to rectify and smooth a voltage induced by the second secondary winding S2 of the transformer T1 and output a second output voltage V02 from a second output terminal.

The multiple-output switching power source apparatus also has a feedback circuit 5 to feed a signal corresponding to a voltage generated on the secondary side of the transformer T1 back to the primary side. An input side of the feedback circuit 5 is connected to the first output terminal. The feedback circuit 5 compares a voltage across the smoothing capacitor C1 with a predetermined reference voltage and feeds an error voltage as a voltage error signal back to the control circuit 10 on the primary side.

According to the voltage error signal from the feedback circuit 5, the control circuit 10 alternately turns on/off the first and second switching elements Q1 and Q2 to conduct PWM control in such a way as to keep the first output voltage Vo1 constant. Each gate of the first and second switching elements Q1 and Q2 receives, as a control signal, a voltage involving a dead time of about several hundreds of nanoseconds. This enables the first and second switching elements Q1 and Q2 to alternately turn on/off without the ON periods of the first and second switching elements Q1 and Q2 overlapping.

Operation of the multiple-output switching power source apparatus according to the related art having the above-mentioned configuration will be explained with reference to waveforms illustrated in FIG. 2.

In FIG. 2, $VQ2ds$ is a drain-source voltage of the second switching element Q2, IQ1 is a current passing through a drain of the first switching element Q1, IQ2 is a current passing through a drain of the second switching element Q2, Icri is a current passing through the current resonant capacitor Cri, Vcri is a voltage across the current resonant capacitor Cri, ID1 is a current passing through the diode D1, VN2 is a voltage across the first secondary winding S1, and ID2 is a current passing through the diode D2.

The first output voltage Vo1 is controlled by the control circuit 10 that receives a voltage error signal fed back to the primary side from the first rectifying-smoothing circuit through the feedback circuit 5 and conducts the PWM control on the first switching element Q1. As mentioned above, the first and second switching elements Q1 and Q2 are alternately turned on/off according to control signals from the control circuit 10 with a dead time of about several hundreds of nanoseconds.

In an ON period (for example, from time t11 to t12) of the first switching element Q1, the current resonant capacitor Cri accumulates energy through an exciting inductance of the primary winding P1 of the transformer T1 and the reactor Lr (leakage inductance between the primary and secondary sides of the transformer T1).

In an ON period (for example, from time t12 to t14) of the second switching element Q2, the energy accumulated in the current resonant capacitor Cri causes the reactor Lr and current resonant capacitor Cri to pass a resonant current and send energy to the secondary side. The exciting energy of the exciting inductance of the primary winding P1 is reset.

More precisely, in the ON period of the second switching element Q2, the primary winding P1 receives a voltage that is obtained by dividing the voltage Vcri across the current resonant capacitor Cri by the exciting inductance of the primary winding P1 and the reactor Lr. When the voltage applied to the primary winding P1 reaches a level of $(Vo1+Vf) \times N1/N2$, the voltage is clamped and the current resonant capacitor Cri and reactor Lr pass a resonant current and send energy to the secondary side. This results in passing the current ID1 through the diode D1. When the voltage of the primary winding P1 is smaller than the level of $(Vo1+Vf) \times N1/N2$, no energy is sent to the secondary side of the transformer T1 and the exciting inductance of the primary winding P1 of the transformer T1, the reactor Lr, and the current resonant capacitor Cri produce a resonant operation only on the primary side.

The ON period of the second switching element Q2 is determined by the ON period of the first switching element Q1 under a fixed frequency, or is an optional constant period. The ON period of the first switching element Q1 may be changed to change duty ratios of the first and second switching elements Q1 and Q2, thereby changing an energy quantity sent to the secondary side.

The first and second secondary windings S1 and S2 are coupled with each other at the same polarity. In an ON period of the second switching element Q2, energy from the first secondary winding S1 is outputted as the first output voltage Vo1. During this period, energy from the second secondary winding S2 is outputted as the second output voltage V02, which is substantially equal to a level of $Vo1 \times N3/N2$.

In practice, however, voltages generated by the first and second secondary windings S1 and S2 are higher than the first and second output voltages Vo1 and Vo2 each by a forward voltage drop Vf of the diodes D1 and D2. Accordingly, a change in Vf due to a change in load on each output worsens a cross regulation. In a power source apparatus with variable output voltages, a change in one output voltage results in proportionally changing the other output voltage. This makes it impossible to directly provide a plurality of outputs from windings.

FIG. 3 is a circuit diagram illustrating a configuration of a multiple-output switching power source apparatus according to another related art. This multiple-output switching power source apparatus employs, instead of the second rectifying-smoothing circuit illustrated in FIG. 1, a regulator 12 such as a dropper or a step-down chopper, to generate a second output voltage V02 from a first output voltage Vo1 so as to stabilize the outputs. This multiple-output switching power source apparatus may solve the cross regulation problem between two outputs. The regulator 12, however, increases a loss and additional parts such as switching elements, choke coils, and control ICs increase costs and packaging spaces. In addition, the switching regulator such as a step-down chopper unavoidably generates noise.

A multiple-output switching power source apparatus disclosed in Japanese Unexamined Patent Application Publication No. 2003-259644 proposes a switching converter circuit that stabilizes two kinds of voltage with a single converter. This switching converter circuit employs a second switching element as an active snubber to control ON/OFF of a first switching element and stabilize a first output. During an OFF period of the first switching element, the circuit controls ON/OFF of the second switching element to stabilize a second output. This switching converter circuit may stabilize two kinds of output with a single converter. This circuit, however, must have two secondary windings because a secondary winding to provide the first output must have an opposite polarity with respect to a secondary winding that provides the second output.

DISCLOSURE OF INVENTION

As explained above, the multiple-output switching power source apparatus according to the related art has the problem that, if a change occurs in load on each output, a cross regulation worsens. The power source apparatus with variable output voltages has the problem that windings of the apparatus are unable to directly provide the plurality of outputs. The related art that employs a regulator on the secondary side to solve the problem of cross regulation has the problems that the regulator increases a loss, additional parts increase costs and packaging spaces, and the regulator generates noise. The switching converter circuit disclosed in the patent document 1 carries out no current resonance, and therefore, there is an occasion that the converter is switched while a current is passing through rectifying diode on the secondary side. This raises a problem of generating noise.

The present invention provides a multiple-output switching power source apparatus capable of stabilizing a plurality of outputs irrespective of a change in load.

Means to Solve the Problems

To solve the above-mentioned problems, a first technical aspect of the present invention provides a multiple-output switching power source apparatus having first and second switching elements connected in series between electrodes of a DC power source; a first series resonant circuit connected in parallel with the first or second switching element and including a primary winding of a first transformer and a first current resonant capacitor; a first rectifying-smoothing circuit configured to rectify and smooth a voltage generated by a secondary winding of the first transformer in an ON period of the first or second switching element and provide a first output voltage; a second series resonant circuit connected in parallel with the first or second switching element and including a primary winding of a second transformer and a second current resonant circuit; a second rectifying-smoothing circuit configured to rectify and smooth a voltage generated by a secondary winding of the second transformer in the ON period of the first or second switching element and provide a second output voltage; a control circuit configured to control an ON period of the first switching element according to the first output voltage and an ON period of the second switching element according to the second output voltage; and a limiting circuit configured to limit the ON period of the first switching element if the second output voltage exceeds a predetermined voltage.

A second technical aspect of the present invention provides a multiple-output switching power source apparatus having first and second switching elements connected in series between electrodes of a DC power source; a first series resonant circuit connected in parallel with the first or second switching element and including a primary winding of a first transformer and a first current resonant capacitor; a first rectifying-smoothing circuit configured to rectify and smooth a voltage generated by a secondary winding of the first transformer in an ON period of the first or second switching element and provide a first output voltage; a second series resonant circuit connected in parallel with the first or second switching element and including a primary winding of a second transformer and a second current resonant circuit; a second rectifying-smoothing circuit configured to rectify and smooth a voltage generated by a secondary winding of the second transformer in the ON period of the first or second switching element and provide a second output voltage; a control circuit configured to control an ON period of the second switching element according to the first output voltage and an ON period of the first switching element according to the second output voltage; and a limiting circuit configured to limit the ON period of the first switching element if the second output voltage exceeds a predetermined voltage.

A third technical aspect of the present invention provides a multiple-output switching power source apparatus having first and second switching elements connected in series between electrodes of a DC power source; a first series resonant circuit connected in parallel with the first or second switching element and including a primary winding of a first transformer and a first current resonant capacitor; a first rectifying-smoothing circuit configured to rectify and smooth a voltage generated by a secondary winding of the first transformer in an ON period of the first or second switching element and provide a first output voltage; a second series resonant circuit connected in parallel with the first or second switching element and including a primary winding of a second transformer and a second current resonant circuit; a second rectifying-smoothing circuit configured to rectify and smooth a voltage generated by a secondary winding of the second transformer in the ON period of the first or second switching element and provide a second output voltage; and a control circuit configured to control an ON duty of the first switching element according to the first output voltage, and

BEST MODE OF IMPLEMENTING INVENTION

Multiple-output switching power source apparatuses according to embodiments of the present invention will be explained in detail with reference to the drawings. The same or corresponding parts as those of the multiple-output switching power source apparatuses explained in BACKGROUND TECHNOLOGY will be explained with the use of the same reference marks as those used in BACKGROUND TECHNOLOGY.

Embodiment 1

Figure 1:
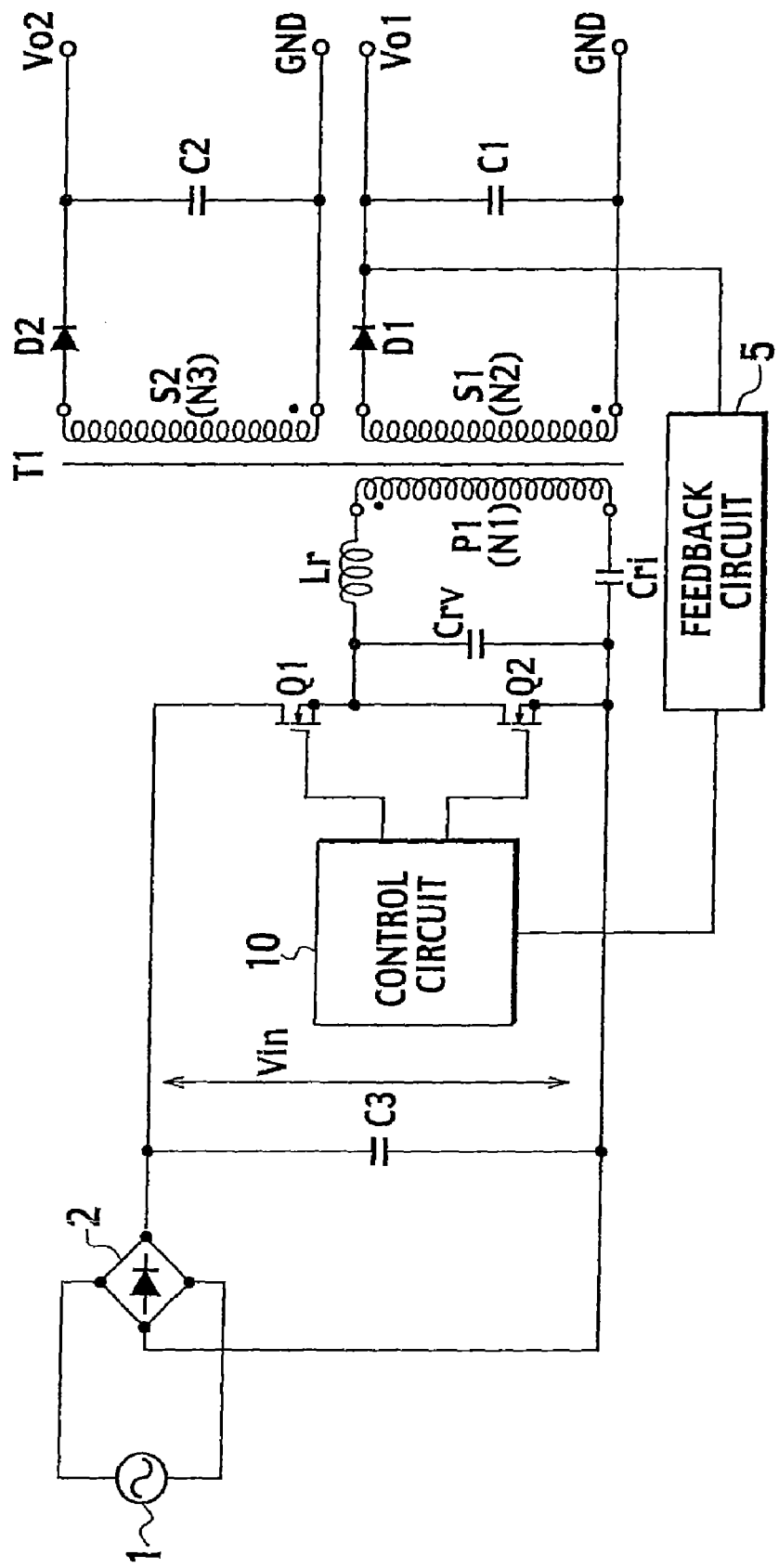
FIG. 1 is a circuit diagram illustrating a configuration of a multiple-output switching power source apparatus according to a related art.
Figure 2:
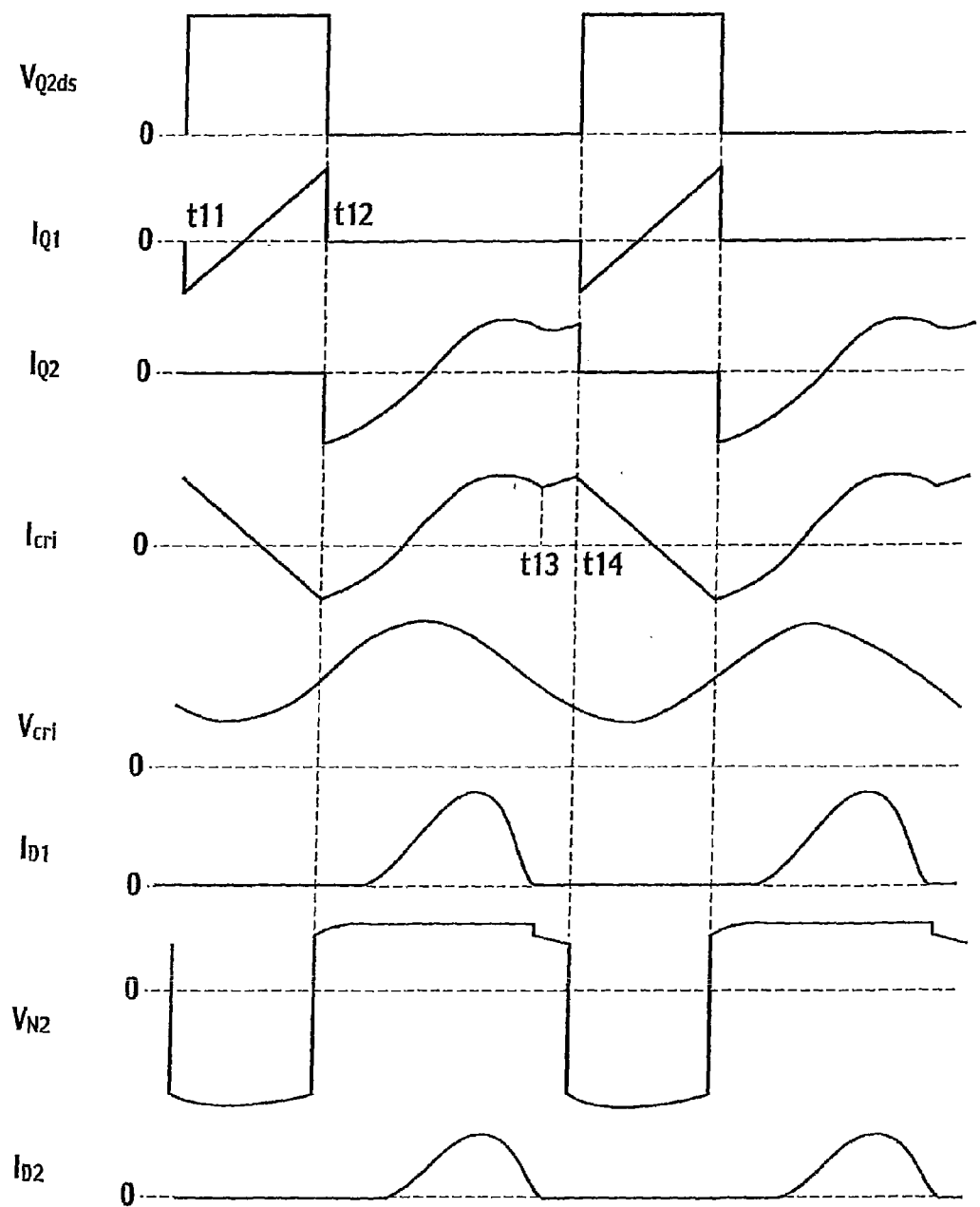
FIG. 2 is a waveform diagram illustrating operation of the multiple-output switching power source apparatus according to the related art.
Figure 3:
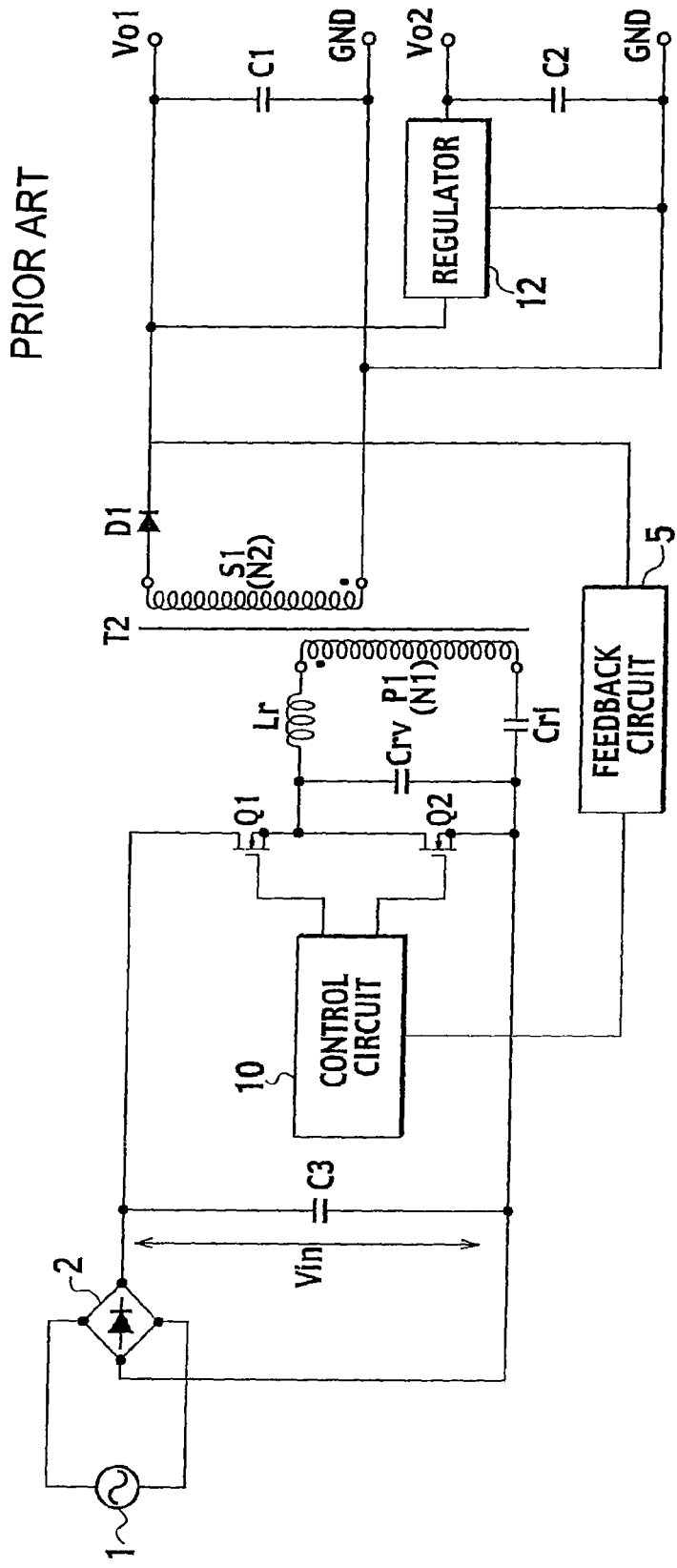
FIG. 3 is a circuit diagram illustrating a configuration of a multiple-output switching power source apparatus according to another related art.
Figure 4:
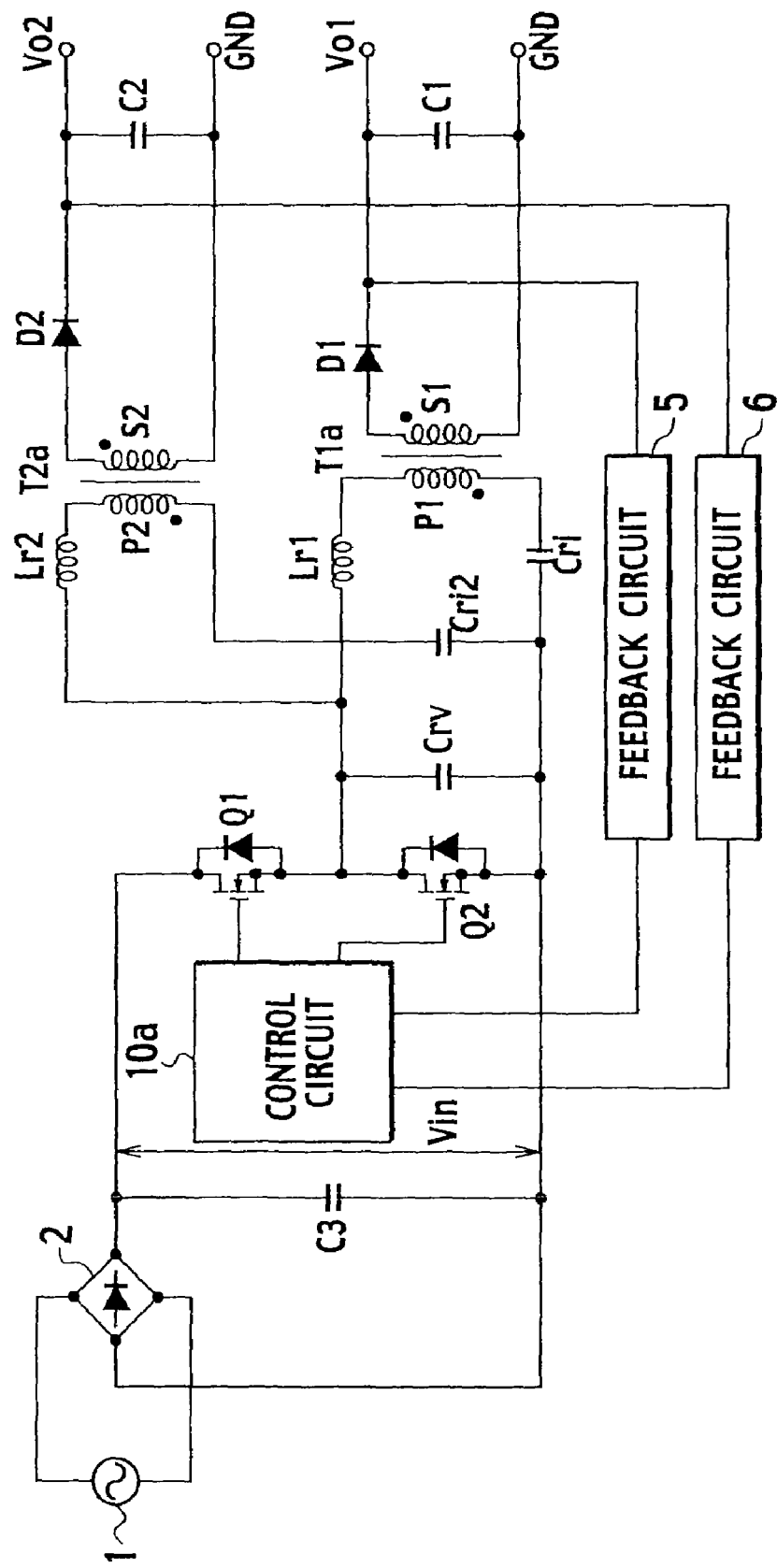
FIG. 4 is a circuit diagram illustrating a configuration of a multiple-output switching power source apparatus according to Embodiment 1 of the present invention.

FIG. 4 is a circuit diagram illustrating a configuration of a multiple-output switching power source apparatus according to Embodiment 1 of the present invention. This multiple-output switching power source apparatus has first and second transformers T1a and T2a. On the primary side of the first and second transformers T1a and T2a, there are arranged a full-wave rectifying circuit 2 to rectify an AC voltage from a commercial power source 1, a smoothing capacitor C3 connected between output terminals of the full-wave rectifying circuit 2, to smooth an output from the full-wave rectifying circuit 2, first and second switching elements Q1 and Q2 made of, for example, MOSFETs connected in series between both ends of the smoothing capacitor C3, to receive a voltage across the smoothing capacitor C3 as a DC input voltage Vin, a control circuit 10a to control ON/OFF of the first and second switching elements Q1 and Q2, a voltage resonant capacitor Crv connected in parallel with the second switching element Q2, and first and second series resonant circuits connected to both ends of the voltage resonant capacitor Crv.

The first series resonant circuit consists of a primary winding P1 (the number of turns of N1a) of the first transformer T1a, a first resonant reactor Lr1, and a first current resonant capacitor Cri that are connected in series. The first resonant reactor Lr1 is, for example, a leakage inductance between the primary and secondary sides of the first transformer T1a.

The second series resonant circuit consists of a primary winding P2 (the number of turns of N1b) of the second transformer T2a, a second resonant reactor Lr2, and a second current resonant capacitor Cri2 that are connected in series. The second resonant reactor Lr2 is, for example, a leakage inductance between the primary and secondary sides of the second transformer T2a.

On the secondary side of the first transformer T1a, there is arranged a first rectifying-smoothing circuit connected to a secondary winding S1 (the number of turns of N2a) wound to generate a voltage whose phase is opposite to the phase of a voltage generated by the primary winding P1 of the first transformer T1a. The first rectifying-smoothing circuit has a diode D1 and a smoothing capacitor C1. An anode of the diode D1 is connected to a first end of the secondary winding S1 and a cathode thereof is connected to a first output terminal. The smoothing capacitor C1 is connected between the cathode of the diode D1 (the first output terminal) and a second end of the secondary winding S1 (a terminal GND). The first rectifying-smoothing circuit rectifies and smoothes a voltage induced by the secondary winding S1 of the first transformer T1a and outputs a first output voltage Vo1 from the first output terminal.

On the secondary side of the second transformer T2a, there is arranged a second rectifying-smoothing circuit connected to a secondary winding S2 (the number of turns of N2b) wound to generate a voltage whose phase is opposite to the phase of a voltage generated by the primary winding P2 of the second transformer T2a. The second rectifying-smoothing circuit consists of a diode D2 and a smoothing capacitor C2. An anode of the diode D2 is connected to a first end of the secondary winding S2 and a cathode thereof is connected to a second output terminal. The smoothing capacitor C2 is connected between the cathode of the diode D2 (the second output terminal) and a second end of the secondary winding S2 (a terminal GND). The second rectifying-smoothing circuit rectifies and smoothes a voltage induced by the secondary winding S2 of the second transformer T2a and outputs a second output voltage V02 from the second output terminal.

The multiple-output switching power source apparatus also has a feedback circuit 5 to feed a voltage generated on the secondary side of the first transformer T1a back to the primary side and a feedback circuit 6 to feed a voltage generated on the secondary side of the second transformer T2a back to the primary side. The feedback circuit 5 compares the first output voltage Vo1 outputted to the first output terminal with a predetermined reference voltage and feeds an error voltage as a first voltage error signal back to the control circuit 10a on the primary side. The feedback circuit 6 compares the second output voltage V02 outputted to the second output terminal with a predetermined reference voltage and feeds an error voltage as a second voltage error signal back to the control circuit 10a on the primary side.

According to the first voltage error signal from the feedback circuit 5 and the second voltage error signal from the feedback circuit 6, the control circuit 10a alternately turns on/off the first and second switching elements Q1 and Q2, to thereby conduct PWM control that keeps the first and second output voltages Vo1 and Vo2 constant. In this case, gates of the first and second switching elements Q1 and Q2 receive, as control signals, voltages involving a dead time of about several hundreds of nanoseconds. This allows the first and second switching elements Q1 and Q2 to alternately turn on/off without ON periods of the switching elements Q1 and Q2 overlapping each other.

More precisely, the control circuit 10a controls the ON period of the second switching element Q2 according to the second voltage error signal provided by the feedback circuit 6 and controls the ON period of the first switching element Q1 according to the first voltage error signal provided by the feedback circuit 5.

The control circuit 10a may control the ON period of the second switching element Q2 according to the first voltage error signal that is based on the output voltage Vo1 and may control the ON period of the first switching element Q1 according to the second voltage error signal that is based on the output voltage V02.

Operation of the multiple-output switching power source apparatus according to Embodiment 1 of the present invention having such a configuration will be explained with reference to a waveform diagram illustrated in FIG. 5 in which the output Vo2 is under heavy load and a waveform diagram illustrated in FIG. 6 in which the output Vo2 is under light load.

Figure 5:
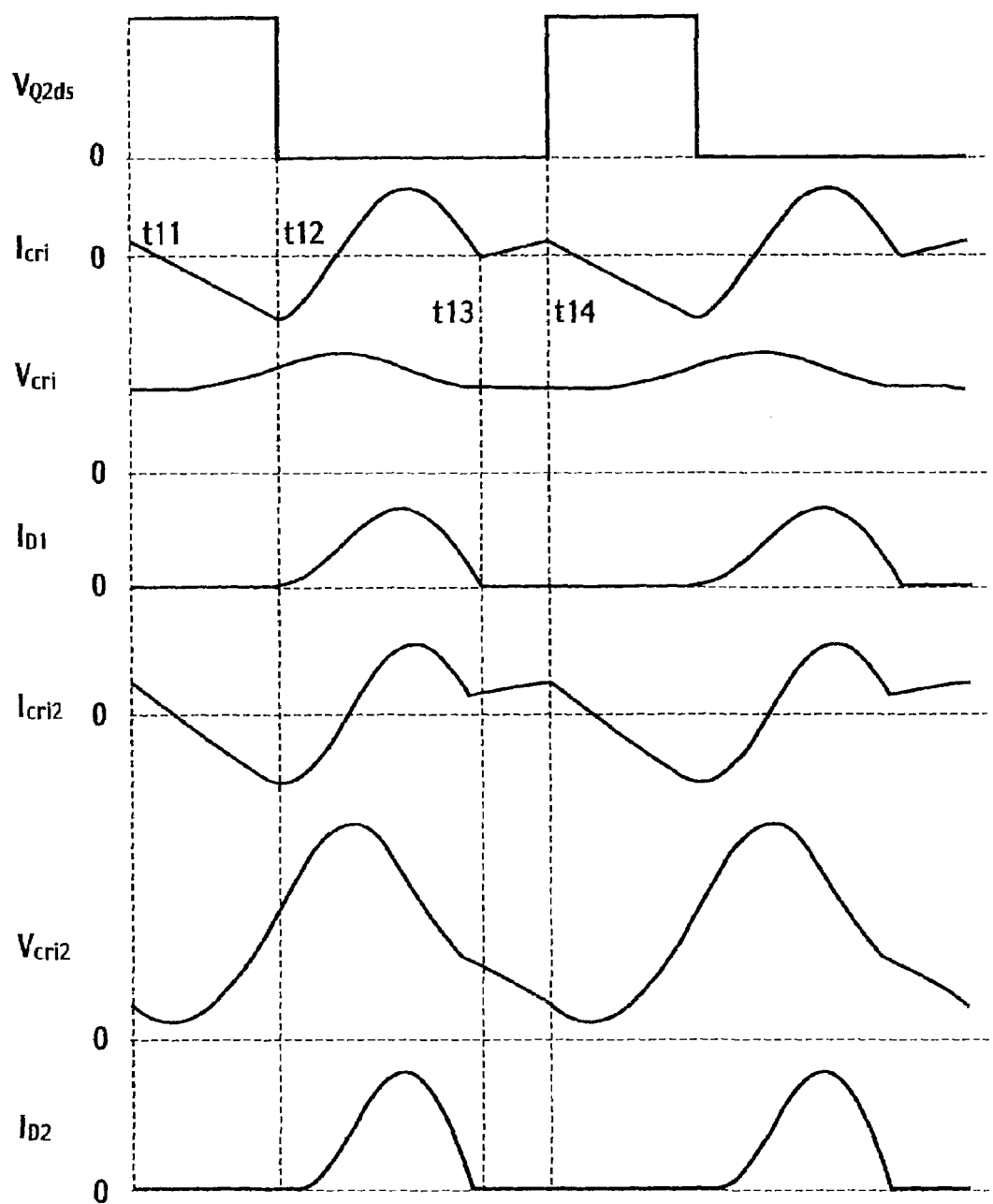
FIG. 5 is a waveform diagram when an output Vo2 of the multiple-output switching power source apparatus according to Embodiment 1 of the present invention operates under heavy load.
Figure 6:
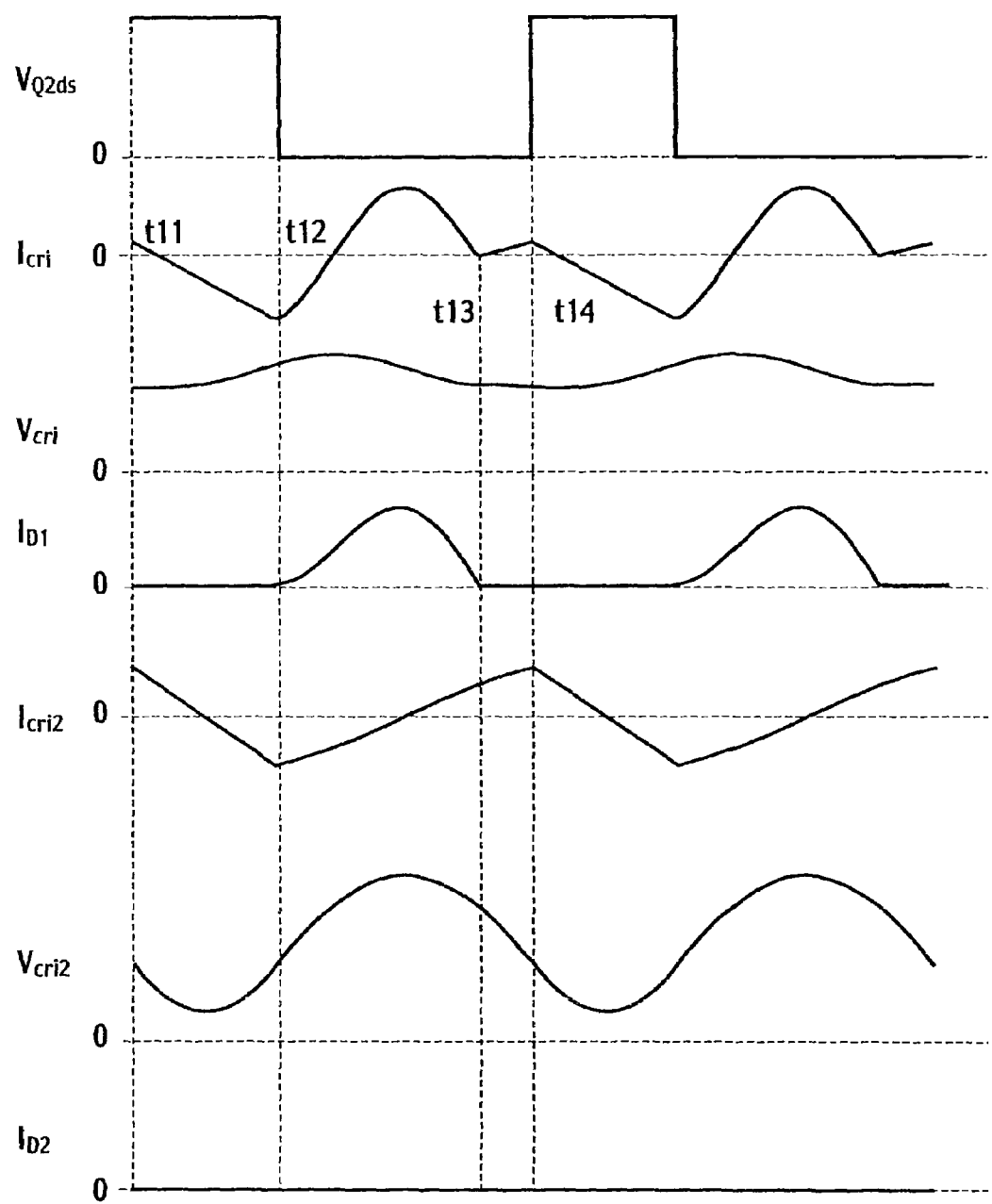
FIG. 6 is a waveform diagram when the output Vo2 of the multiple-output switching power source apparatus according to Embodiment 1 of the present invention operates under light load.

In FIGS. 5 and 6, VQ2ds is a drain-source voltage of the second switching element Q2, Icri is a current passing through the first current resonant capacitor Cri, Vcri is a voltage across the first current resonant capacitor Cri, ID1 is a current passing through the diode D1, Icri2 is a current passing through the second current resonant capacitor Cri2, Vcri2 is a voltage across the second current resonant capacitor Cri2, and ID2 is a current passing through the diode D2.

In an ON period (time t1 to t2) of the first switching element Q1, the first and second series resonant circuits receive the input voltage Vin and carry out a resonant operation to pass excitation currents through the primary windings P1 and P2 and charge the first and second current resonant capacitors Cri and Cri2.

When the first switching element Q1 turns off and the second switching element Q2 turns on (from time t2 to t3), voltages of the first and second current resonant capacitors Cri and Cri2 are applied to the primary windings P1 and P2 of the first and second transformers T1a and T2a and the first and second resonant reactors Lr1 and Lr2 and first and second current resonant capacitors Cri and Cri2 pass resonant currents, which are transferred to the secondary side. As a result, the secondary windings S1 and S2 induce voltages, which are rectified by the diodes D1 and D2 and are supplied as the first and second output voltages Vo1 and Vo2 from the first and second output terminals.

In this way, in the multiple-output switching power source apparatus, the first and second series resonant circuits similarly operate. If the leakage inductance Lr1 is decreased and the capacitance of the first current resonant capacitor Cri is increased in the first series resonant circuit, and in the second series resonant circuit, the leakage inductance Lr2 is increased and the capacitance of the second current resonant capacitor Cri2 is decreased, power supplied to the output voltage Vo1 and power supplied to the output voltage V02 can be changed.

When the first switching element Q1 has an ON duty of Don1 and the first and second switching elements Q1 and Q2 are alternately turned on/off, an average of the voltages of the first and second current resonance capacitors Cri and Cri2 will be a level of Vin×Don1.

In the first series resonant circuit, the capacitance of the first current resonant capacitor Cri is large, and therefore, has a small amplitude. Since the leakage inductance Lr1 is small, an impedance between the primary and secondary sides of the first transformer T1a is small. A voltage generated by the secondary winding S1 of the first transformer T1a in an ON period of the second switching element Q2 is substantially equal to a product obtained by multiplying the voltage of the first current resonant capacitor Cri by a turn ratio. Accordingly, the output voltage Vo1 is controllable by adjusting the ON duty of the first switching element Q1.

On the other hand, the second current resonant capacitor Cri2 in the second series resonant circuit has small capacitance, and therefore, the second current resonance capacitor Cri2 has a large amplitude. Since the leakage inductance Lr2 is large and the voltage of the second current resonant capacitor Cri2 is limited by the leakage inductance Lr2, a voltage generated by the secondary winding S2 of the second transformer T2a is not equal to a product obtained by multiplying the voltage of the second current resonant capacitor Cri2 by a turn ratio.

Due to this, a power supplied to the secondary side should be adjusted in order to adjust the voltage amplitude of the second current resonant capacitor Cri2. The voltage amplitude of the second current resonant capacitor Cri2 is adjustable by adjusting a switching frequency or by adjusting the ON width of the first switching element Q1. Namely, adjusting the ON duty of the first switching element Q1 results in controlling the output voltage Vo1 and adjusting the switching frequency of the first and second switching elements Q1 and Q2 results in controlling the output voltage Vo2.

Concrete Example of Control Circuit

Figure 7:
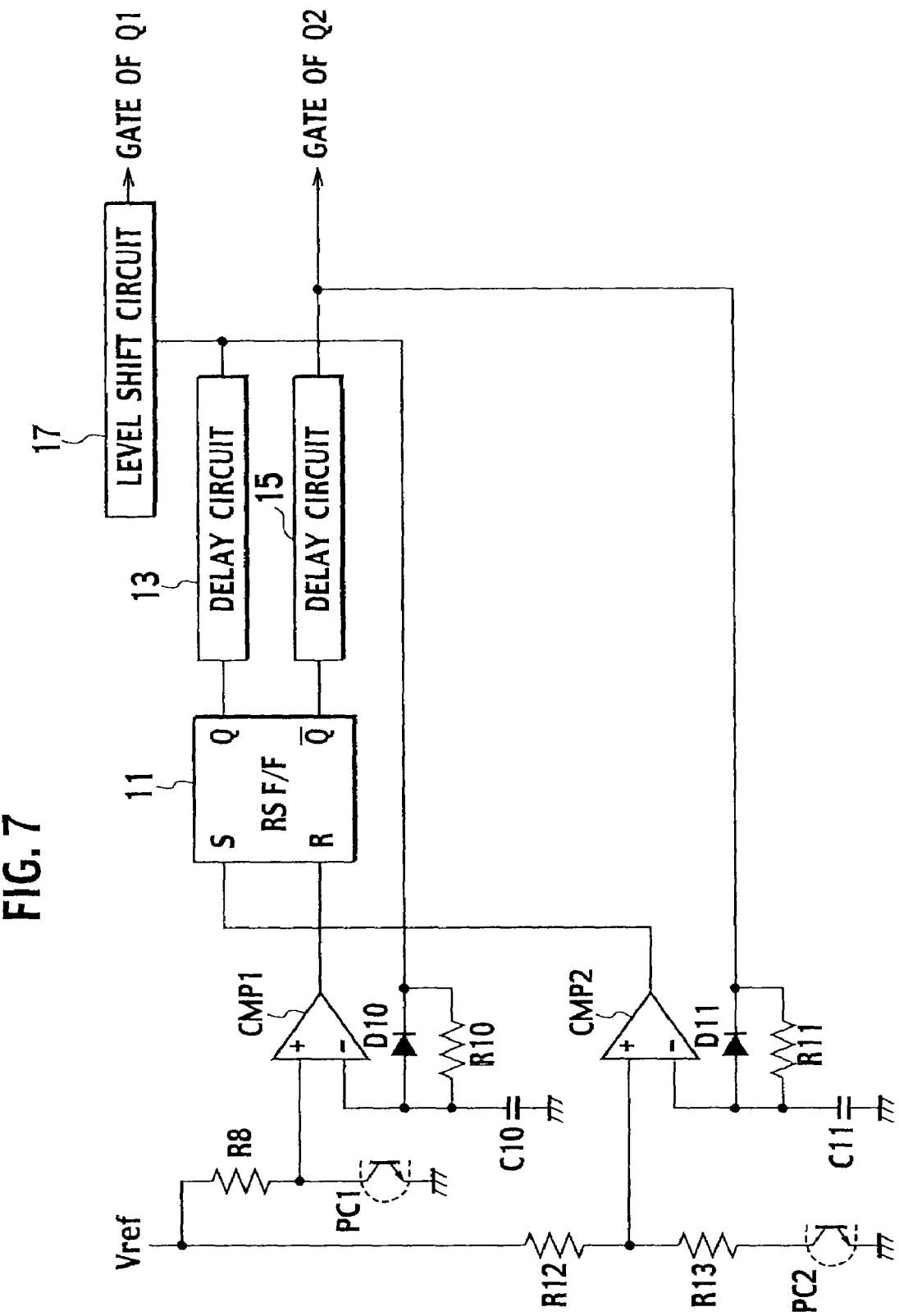
FIG. 7 is a circuit diagram illustrating an example of a control circuit of the multiple-output switching power source apparatus according to Embodiment 1 of the present invention.
Figure 8:
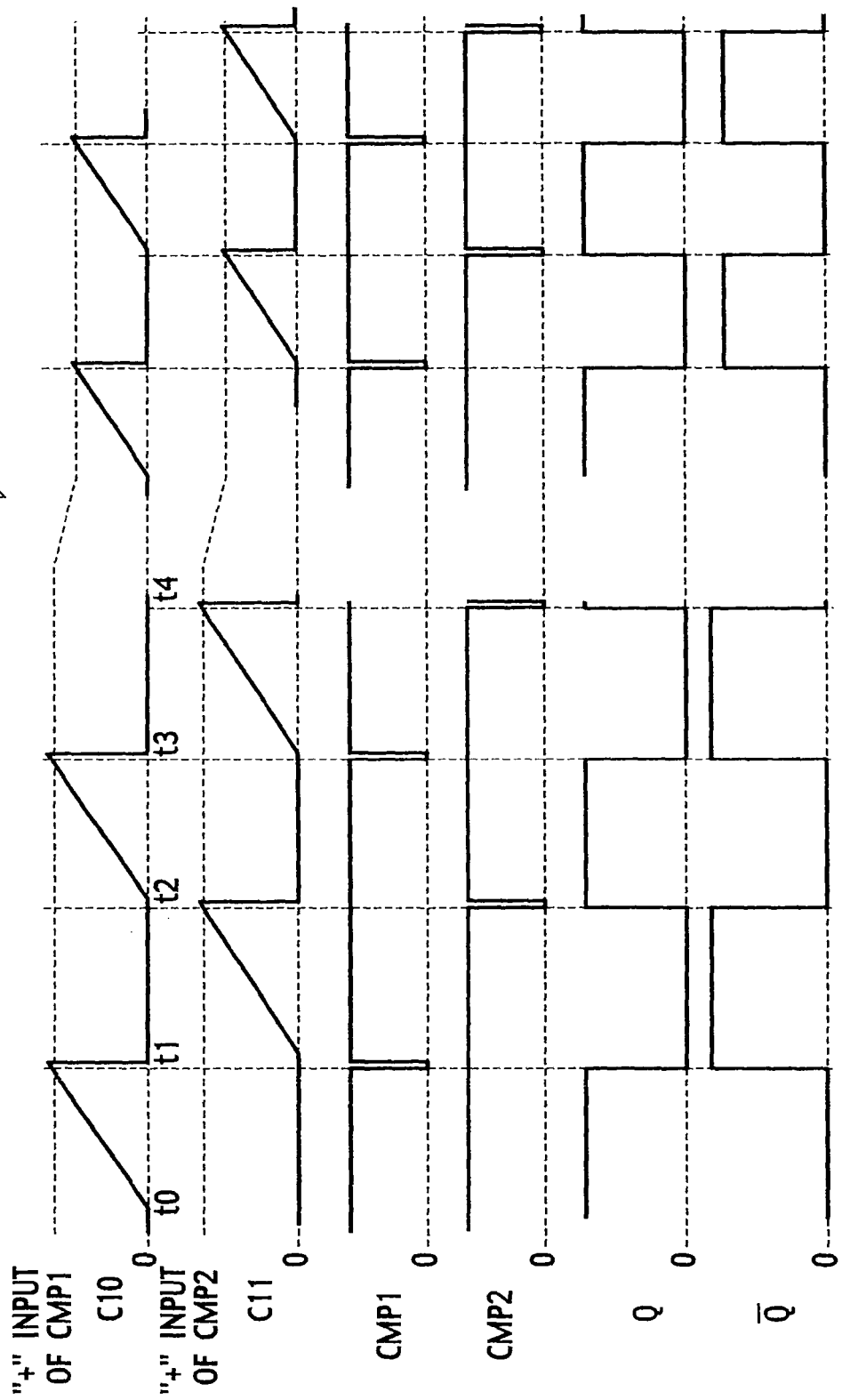
FIG. 8 is a waveform diagram illustrating operation of the control circuit example of the multiple-output switching power source apparatus according to Embodiment 1 of the present invention.

A concrete example of the control circuit of the multiple-output switching power source apparatus illustrated in FIG. 4 will be explained with reference to FIGS. 7 and 8. FIG. 7 is a circuit diagram illustrating an example of the control circuit 10a illustrated in FIG. 4. FIG. 8 is a waveform diagram illustrating operation of the control circuit illustrated in FIG. 7.

In the control circuit 10a illustrated in FIG. 7, connected between a reference power source Vref and the ground are a first series circuit including a resistor R8 and a photocoupler PC1 and a second series circuit including resistors R12 and R13 and a photocoupler PC2. The photocoupler PC1 is included in the feedback circuit 5 and transfers a feedback signal from the output voltage Vo1 to the control circuit 10a. The photocoupler PC2 is included in the feedback circuit 6 and transfers a feedback signal from the output voltage V02 to the control circuit 10a.

A plus terminal (depicted by "+") of a comparator CMP1 is connected to a connection point between the resistor R8 and the photocoupler PC1 and a minus terminal (depicted by "−")

of the comparator CMP1 is connected to a first end of a capacitor C10, an anode of a diode D10, and a first end of a resistor R10. A second end of the capacitor C10 is grounded. A cathode of the diode D10 and a second end of the resistor R10 are connected to an output end of a delay circuit 13 and an input end of a level shift circuit 17.

The comparator CMP1 compares a voltage at the plus terminal with a voltage at the minus terminal and outputs a comparison result to a reset terminal R of an RS flip-flop circuit 11 (hereinafter referred to as "RSF/F 11").

A plus terminal (depicted by "+") of a comparator CMP2 is connected to a connection point between the resistors R12 and R13 and a minus terminal (depicted by "−") of the comparator CMP2 is connected to a first end of a capacitor C11, an anode of a diode D11, and a first end of a resistor R11. A second end of the capacitor C11 is grounded. A cathode of the diode D11 and a second end of the resistor R11 are connected to an output end of a delay circuit 15 and a gate of the switching element Q2.

The comparator CMP2 compares a voltage at the plus terminal with a voltage at the minus terminal and outputs a comparison result to a set terminal S of the RSF/F 11.

The delay circuit 13 delays an output Q of the RSF/F 11 by a predetermined time to prevent the first and second switching elements Q1 and Q2 from simultaneously turning on and is connected through the level shift circuit 17 to a gate terminal of the first switching element Q1. The delay circuit 15 delays an inverted output Q1 of the RSF/F 11 by a predetermined time to prevent the first and second switching elements Q1 and Q2 from simultaneously turning on and is connected to the gate terminal of the switching element Q2.

Operation of the control circuit illustrated in FIG. 7 having the above-mentioned configuration will be explained with reference to the waveform diagram of FIG. 8.

When the output Q of the RSF/F 11 is high (time t0), a gate drive signal is applied through the delay circuit 13 and level shift circuit 17 to the gate of the first switching element Q1, to turn on the first switching element Q1. The high-level output Q of the RSF/F 11 gradually charges the capacitor C10 through the resistor R10.

When the voltage of the capacitor C10 reaches a voltage at the plus terminal of the comparator CMP1 (time t1), the output of the comparator CMP1 inverts to provide the reset terminal R (negative logic in this embodiment) of the RSF/F 11 with a low-level signal.

This results in inverting the output of the RSF/F 11, so that the output Q becomes low and the inverted output Q1 high. Then, the gate voltage of the switching element Q1 drops to turn off the first switching element Q1 and discharge the capacitor C10 to drop the voltage of the capacitor C10.

Since the inverted output Q1 of the RSF/F 11 is high, a gate drive signal is applied through the delay circuit 15 to the second switching element Q2 to turn on the second switching element Q2 and gradually charge the capacitor C11 through the resistor R11 (time t1 to t2).

When the voltage of the capacitor C11 reaches a voltage at the plus terminal of the comparator CMP2 (time t2), the output of the comparator CMP2 inverts to provide the set terminal S (negative logic in the present embodiment) of the RSF/F 11 with a low level signal. This inverts the output of the RSF/F 11, so that the inverted output Q1 becomes low and the output Q high. Then, the gate voltage of the second switching element Q2 drops to turn off the second switching element Q2 and the capacitor C10 discharges to drop the voltage thereof.

Through the delay circuit 13 and level shift circuit 17, a gate drive signal is applied to the first switching element Q1 to turn on the first switching element Q1. These operations are repeated to alternately turn on/off the first and second switching elements Q1 and Q2.

The outputs Vo1 and Vo2 are controlled by changing voltages at the photocouplers PC1 and PC2 through the feedback circuits 5 and 6 to change the ON widths, ON duties, and frequency of the first and second switching elements Q1 and Q2.

If load on the output voltage V02 becomes lighter, a feedback signal from the feedback circuit 6 lowers the voltage of the photocoupler PC2 to shorten the ON width of the second switching element Q2.

This increases the ON duty of the first switching element Q1 to increase the output voltage Vo1. Then, a feedback signal from the feedback circuit 5 lowers the voltage of the photocoupler PC1 to shorten the ON width of the first switching element Q1, thereby controlling the ON duty of the first switching element Q1.

These operations change the switching frequency in such a way as to stabilize the output Vo2. As mentioned above, the multiple-output switching power source apparatus of Embodiment 1 illustrated in FIG. 4 employs a pair of half-bridge converters to stabilize the two output voltages Vo1 and Vo2.

Embodiment 2

According to the multiple-output switching power source apparatus illustrated in FIG. 4, if the output voltage V02 first rises at the start of the apparatus, the feedback circuit 6 transfers an error signal related to the output voltage V02 to the control circuit 10a on the primary side and the control circuit 10a tries to shorten the ON width of the second switching element Q2.

The output voltage Vo1, however, is equal to or lower than a set voltage, and therefore, there is no feedback signal from the feedback circuit 5. Accordingly, the ON width of the first switching element Q1 is maximally opened. It is, therefore, impossible to restrict the voltage amplitude of the second current resonant capacitor Cri2 and the output voltage V02 is uncontrollable even if the ON width of the second switching element Q2 is narrowed. Since the ON width of the second switching element Q2 is narrowed, the ON duty of the first switching element Q1 becomes larger to increase an average of the second current resonant capacitor Cri2 and further increase the output voltage V02.

A similar problem arises if the output voltage Vo1 decreases due to, for example, overload. In this way, the multiple-output switching power source apparatus illustrated in FIG. 4 sharply increases the output voltage V02 depending on load balance at the start of the apparatus or under overload.

To cope with this, the multiple-output switching power source apparatus according to Embodiment 2 prevents two outputs from leaping at the start of the apparatus or under overload.

Figure 9:
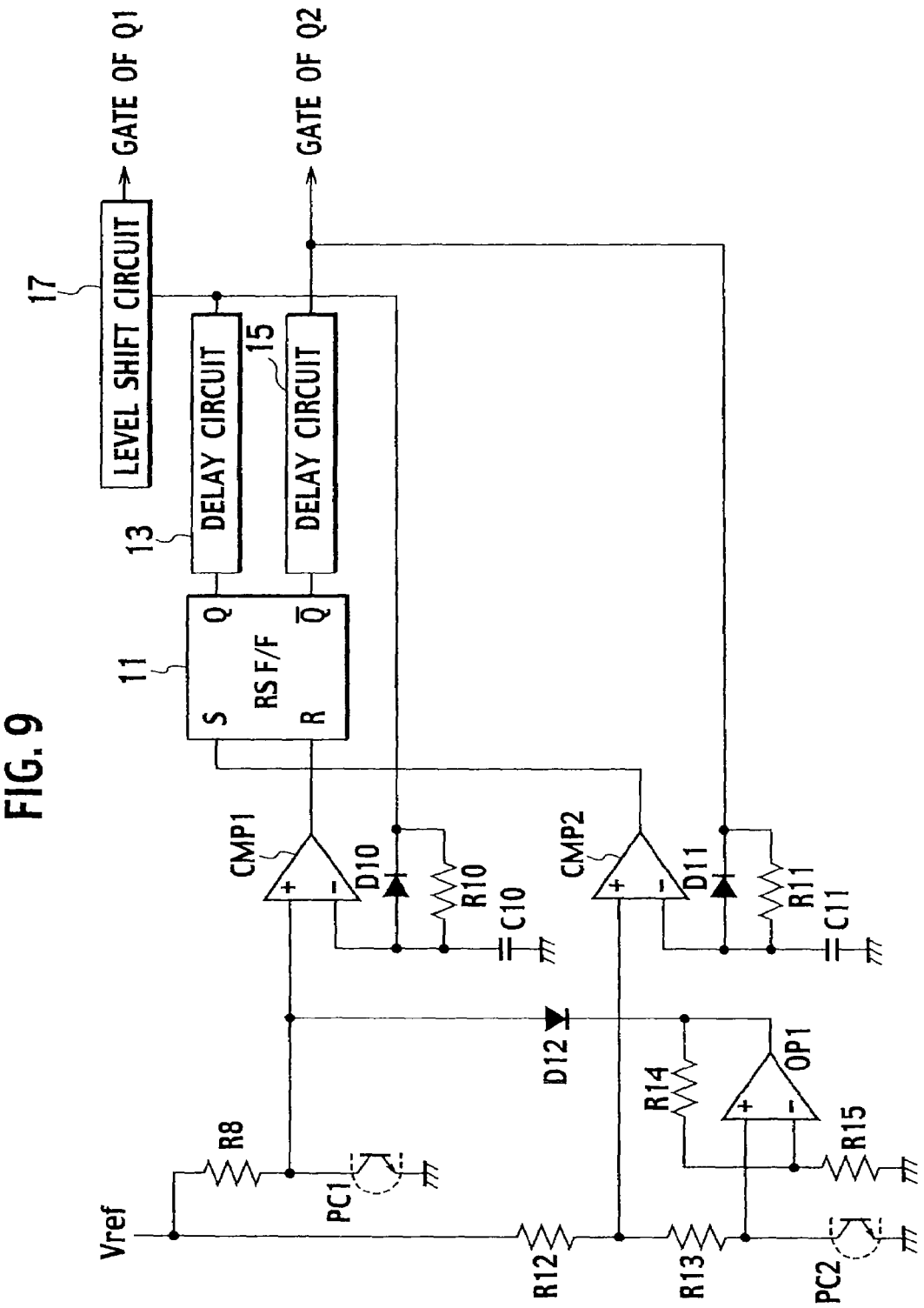
FIG. 9 is a circuit diagram illustrating an example of a control circuit of a multiple-output switching power source apparatus according to Embodiment 2 of the present invention.

FIG. 9 is a circuit diagram illustrating an example of a control circuit in the multiple-output switching power source apparatus according to Embodiment 2 of the present invention. Compared with the control circuit in the multiple-output switching power source apparatus illustrated in FIG. 4, the multiple-output switching power source apparatus of Embodiment 2 illustrated in FIG. 9 additionally has an operational amplifier OP1, a diode D12, and resistors R14 and R15, to form a limiting circuit of the present invention.

A non-inverting terminal (as depicted by "+") of the operational amplifier OP1 is connected to a connection point between a collector of a photocoupler PC2 and a resistor R13 and an inverting terminal (as depicted by "−") of the operational amplifier OP1 is connected to a first end of the resistor R14 and a first end of the resistor R15. A second end of the resistor R15 is grounded. An output end of the operational amplifier OP1 is connected to a cathode of the diode D12 and a second end of the resistor R14. An output voltage of the operational amplifier OP1 is divided by the resistors R14 and R15 and is fed back to the inverting terminal of the operational amplifier OP1. An anode of the diode D12 is connected to a plus terminal (depicted by "+") of a comparator CMP1 and a connection point between a collector of a photocoupler PC1 and a resistor R8.

Figure 10:
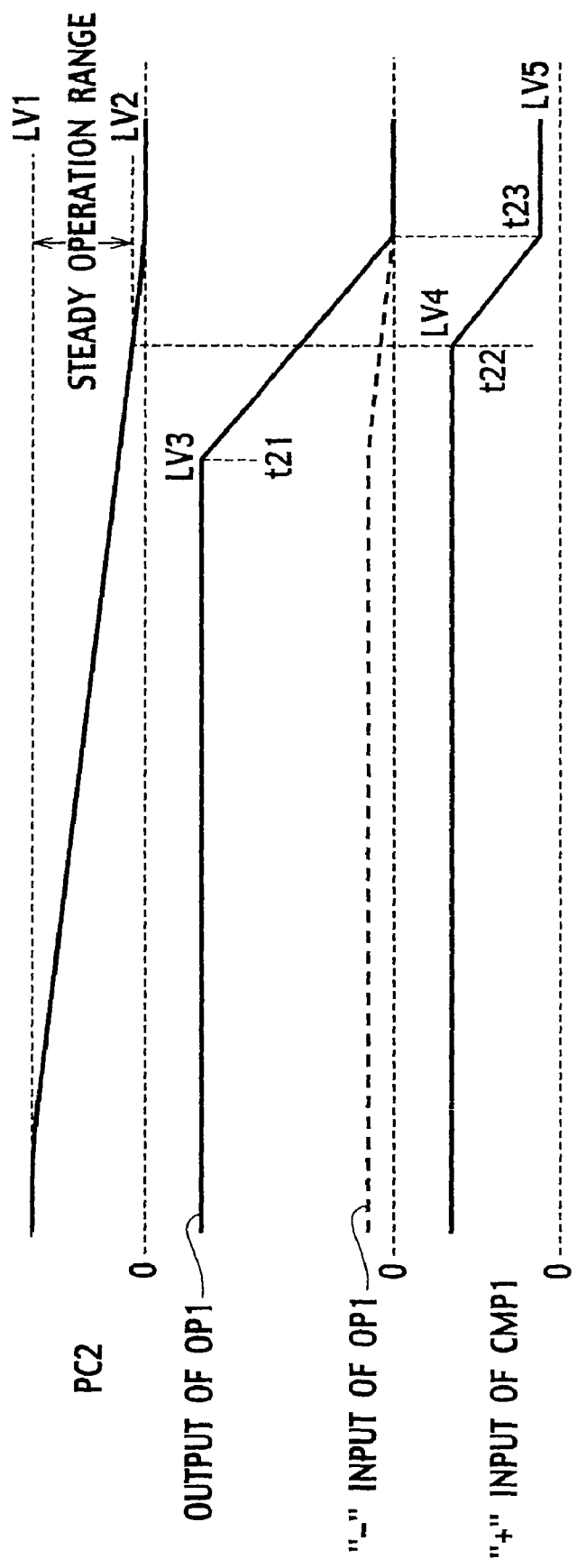
FIG. 10 is a waveform diagram illustrating operation of the control circuit example of the multiple-output switching power source apparatus according to Embodiment 2 of the present invention.

FIG. 10 is a waveform diagram illustrating a voltage of the photocoupler PC2 and a voltage of the operational amplifier OP1 in the control circuit of FIG. 9. With reference to FIG. 10, operation of the control circuit of FIG. 9 will be explained. In FIG. 10, the photocoupler PC2 has a steady operation range from a voltage level LV1 to a voltage level LV2.

An output of the operational amplifier OP1 is restricted in its upper limit by a power source voltage of the operational amplifier OP1. The inverting terminal of the operational amplifier OP1 receives a voltage through the resistors R14 and R15 that divide the upper limit of the output voltage of the operational amplifier OP1. Resistance values of the resistors R14 and R15 are preset so that the divided voltage from the resistors R14 and R15 is low, about several hundreds of millivolts to one volt.

If there is no feedback signal from the feedback circuit 6 before the output voltage V02 rises (before time t21), the voltage of the photocoupler PC2 is high and a voltage at the non-inverting terminal of the operational amplifier OP1 is sufficiently higher than a voltage at the inverting terminal thereof. As results, the output of the operational amplifier OP1 has a level of an output upper limit LV3.

When the output voltage V02 rises and the feedback circuit 6 transfers a feedback signal, the voltage of the photocoupler PC2 gradually decreases. When the output voltage V02 exceeds a set voltage, the feedback signal increases and the voltage of the photocoupler PC2 further decreases.

When the voltage of the photocoupler PC2 becomes equal to or lower than the voltage at the inverting terminal of the operational amplifier OP1, the output voltage of the operational amplifier OP1 decreases relative to the voltage of the photocoupler PC2 (from time t21) and the operational amplifier OP1 functions to equalize the voltages at the inverting and non-inverting terminals.

When the voltage of the photocoupler PC2 further decreases and the output voltage of the operational amplifier OP1 becomes equal to or lower than the voltage at the plus terminal of the comparator CMP1 (time t22), the diode D12 turns on to pass a current through a path extending along Vref, R8, D12, the output terminal of OP1, and the ground. As results, the voltage at the plus terminal of the comparator CMP1 decreases from the voltage level LV4 (at this time, the photocoupler PC2 is at the voltage level LV2) and reaches the voltage level LV5 at time 23. At this time, the voltage at the inverting terminal of the operational amplifier OP1 is nearly zero. Consequently, the comparator CMP1 acts to reduce the ON width of the first switching element Q1.

During a steady operation, the voltage of the photocoupler PC2 is controlled to be within the steady operation range illustrated in FIG. 10. If the output voltage V02 abnormally increases at the start of the apparatus or the like, not only the ON width of the second switching element Q2 but also the ON width of the first switching element Q1 are narrowed to control a switching frequency, thereby avoiding the abnormal increase of the output voltage V02.

According to this embodiment, the limiting circuit refers to an error voltage obtained by comparing the second output voltage with a reference voltage, to see if the second output voltage is equal to or larger than a predetermined voltage. Accordingly, the limiting circuit can be incorporated in the control circuit, to realize a compact device.

Embodiment 3

Figure 11:
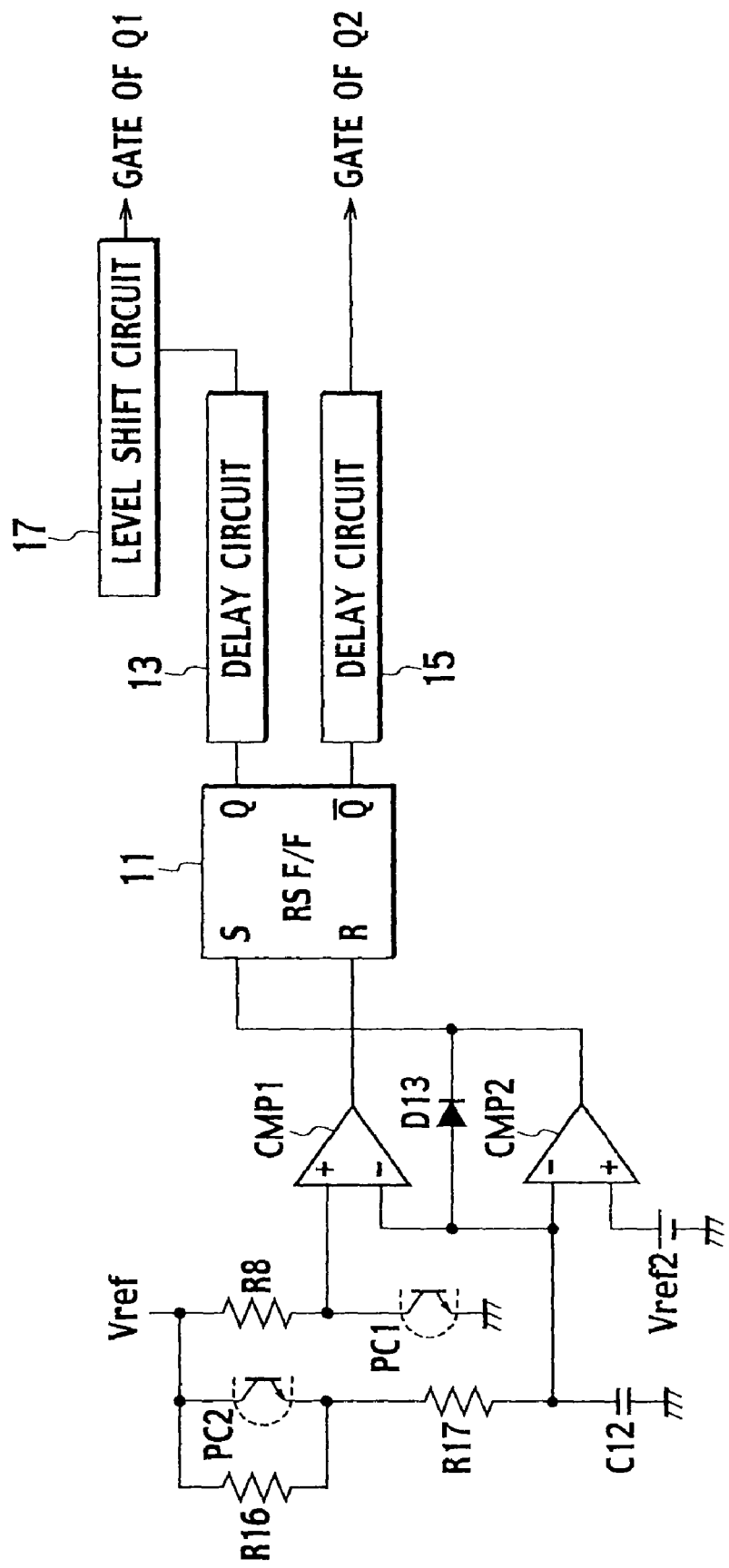
FIG. 11 is a circuit diagram illustrating an example of a control circuit of a multiple-output switching power source apparatus according to Embodiment 3 of the present invention.

FIG. 11 is a circuit diagram illustrating an example of a control circuit of a multiple-output switching power source apparatus according to Embodiment 3 of the present invention.

In FIG. 11, connected between a reference power source Vref and the ground are a first series circuit including a resistor R8 and a photocoupler PC1 and a second series circuit including a photocoupler PC2, a resistor R17, and a capacitor C12. The photocoupler PC2 is connected in parallel with a resistor R16.

A connection point between the resistor R17 and the capacitor C12 is connected to a minus terminal (depicted by "−") of a comparator CMP1, a minus terminal (depicted by "−") of a comparator CMP2, and an anode of a diode D13. A cathode of the diode D13 is connected to an output end of the comparator CMP2 and a set terminal S of an RSF/F 11. A plus terminal (depicted by "+") of the comparator CMP2 is connected to a reference power source Vref2.

A plus terminal (depicted by "+") of the comparator CMP1 is connected to a connection point between the resistor R8 and the photocoupler PC1 and an output end of the comparator CMP1 is connected to a reset terminal R of the RSF/F 11.

The remaining configuration is the same as that illustrated in FIG. 7, and therefore, the same parts are represented with the same reference marks and their explanations are omitted.

Figure 12:
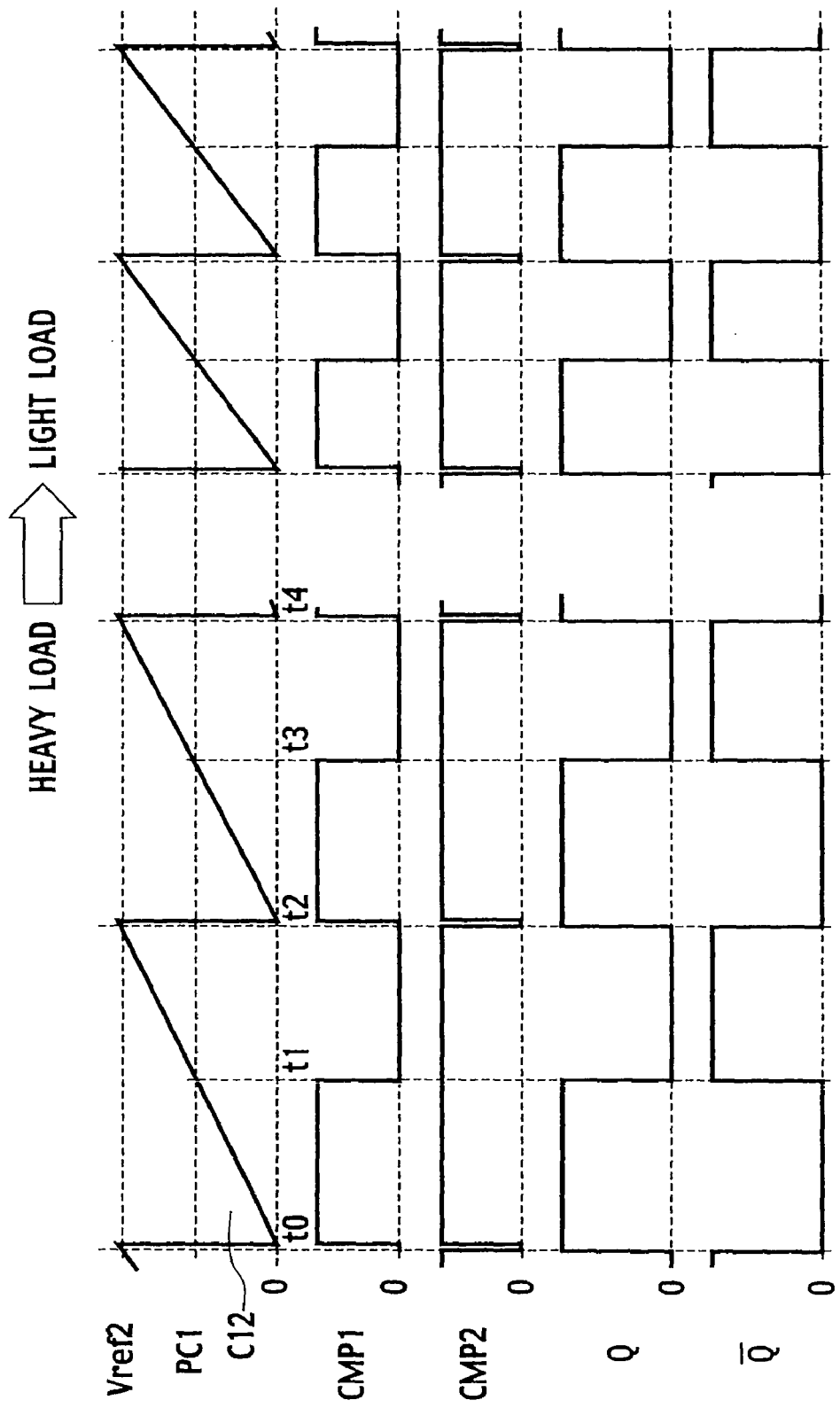
FIG. 12 is a waveform diagram illustrating operation of the control circuit example of the multiple-output switching power source apparatus according to Embodiment 3 of the present invention.

FIG. 12 is a waveform diagram illustrating operation of the control circuit example of the multiple-output switching power source apparatus according to Embodiment 3 of the present invention. Operation of the multiple-output switching power source apparatus of Embodiment 3 will be explained with reference to FIG. 12.

At time t0, an output Q of the RSF/F 11 is initially high and a voltage of the capacitor C12 is initially 0 V. The voltage of the capacitor C12 gradually increases as the capacitor C12 is charged by the reference power source Vref through the photocoupler PC2 and resistors R16 and R17.

At time t1, the voltage of the capacitor C12 reaches the voltage of the photocoupler PC1 and the output of the comparator CMP1 inverts to apply a low-level signal to the reset terminal R (negative logic in this embodiment) of the RSF/F 11. As results, the output Q of the RSF/F 11 becomes low and an inverted output Q1 thereof becomes high.

Thereafter, the voltage of the capacitor C12 further increases, and at time t2, reaches the reference power source voltage Vref2. Then, the output of the comparator CMP2 inverts to provide the set terminal S of the RSF/F 11 with a low-level signal. This makes the inverted output Q1 of the RSF/F 11 low and the output Q thereof high. At the same time, the voltage of the capacitor C12 is discharged through the diode D13 and returns to the initial state of 0 V. These operations are repeated to alternately turn on/off first and second switching elements Q1 and Q2.

When load on the output voltage V02 becomes lighter, a feedback signal from a feedback circuit 6 increases to increase a current passing to the photocoupler PC2. Then, the voltage of the capacitor C12 becomes steeper to shorten the ON periods of the first and second switching elements Q1 and Q2.

Since a control circuit of this embodiment uses the output voltage V02 to control the ON period of the first switching element Q1 and the switching frequency of the second switching element Q2, the output voltage V02 is stabilized.

The output voltage Vo1 is controlled like the control circuit of the related art. Namely, the voltage of the photocoupler PC1 is changed to control the ON duty of the first switching element Q1. When the output voltage V02 reaches a predetermined voltage to provide a feedback signal from a feedback circuit 6 at the start of the apparatus, the control circuit narrows the ON widths of the second and first switching elements Q2 and Q1, to avoid the output voltage V02 from abnormally increasing.

When load on the output voltage V02 varies, the frequency of the first and second switching elements Q1 and Q2 may change and the ON duties thereof may not change. Accordingly, the output voltage Vo1 will be less affected. Compared with the related art, the embodiment is advantageous because it improves response.

The present invention is not limited to the above-mentioned Embodiments 1 to 3. According to Embodiments 1 to 3, the second series resonant circuit is connected in parallel with the voltage resonant capacitor Crv. For example, the second series resonant circuit may be connected in parallel with the primary winding P1 of the first transformer T1a, or the secondary winding S1 thereof, or the tertiary winding thereof. This is equivalent to connecting the second series resonant circuit in parallel with the first or second switching element and provides the same effect.

EFFECT OF INVENTION

According to the first and second technical aspects of the present invention, the limiting circuit is arranged to limit the ON period of the first switching element if the second output voltage exceeds a predetermined voltage. Even if the first output voltage does not reach a predetermined voltage at the start of the apparatus or a restart thereof after an activation of an overcurrent protection circuit, the ON width of the first switching element is limited if the second output voltage exceeds the predetermined voltage, to suppress a voltage increase of the first current resonant capacitor, thereby avoiding an abnormal increase of the second output voltage.

According to the third technical aspect of the present invention, the limiting circuit controls the ON duty of the first switching element according to the first output voltage and controls the switching frequency of the first and second switching elements according to the second output voltage. Accordingly, the limiting circuit operates like the invention of claim 1. According to the second output voltage, the switching frequency at which the first and second switching elements are alternately turned on/off is controlled. Even if the first output voltage does not reach a predetermined voltage at the start of the apparatus or a restart thereof after an activation of an overcurrent protection circuit, the ON width of the first switching element is limited if the second output voltage exceeds a predetermined voltage, to suppress a voltage increase of the first current resonant capacitor, thereby avoiding an abnormal increase in the second output voltage.

(United States Designation)

In connection with United States designation, this application claims benefit of priority under 35 USC §119 to Japanese Patent Application No. 2007-050207 filed on Feb. 28, 2007, the entire contents of which are incorporated by reference herein.

The invention claimed is:

1. A multiple-output switching power source apparatus comprising:
   first and second switching elements connected in series between electrodes of a DC power source;
   a first series resonant circuit being connected in parallel with the first switching element and including a primary winding of a first transformer and a first current resonant capacitor;
   a first rectifying-smoothing circuit configured to rectify and smooth a voltage generated by a secondary winding of the first transformer in an ON period of the first or second switching element and provide a first output voltage;
   a second series resonant circuit being connected in parallel with the first switching element and including a primary winding of a second transformer and a second current resonant capacitor;
   a second rectifying-smoothing circuit configured to rectify and smooth a voltage generated by a secondary winding of the second transformer in the ON period of the first or second switching element and provide a second output voltage;
   a feedback circuit configured to compare the first output voltage with a first reference voltage to generate as a first error voltage, and to compare the second output voltage with a second reference voltage to generate as a second error voltage;
   a control circuit configured to control an ON period of the first switching element according to the first error voltage and an ON period of the second switching element according to the second error voltage, wherein
   if the second output voltage exceeds the second reference voltage regardless of the first output voltage, the control circuit limits the ON period of the first switching element to shorter than an ON period determined for the first switching element according to the first error voltage.

2. The multiple-output switching power source apparatus according to claim 1, wherein the second series resonant circuit is connected in parallel with the primary, secondary, or tertiary winding of the first transformer.

3. A multiple-output switching power source apparatus comprising:
   first and second switching elements connected in series between electrodes of a DC power source;
   a first series resonant circuit being connected in parallel with the first switching element and including a primary winding of a first transformer and a first current resonant capacitor;
   a first rectifying-smoothing circuit configured to rectify and smooth a voltage generated by a secondary winding of the first transformer in an ON period of the first or second switching element and provide a first output voltage;
   a second series resonant circuit being connected in parallel with the first switching element and including a primary winding of a second transformer and a second current resonant capacitor;
   a second rectifying-smoothing circuit configured to rectify and smooth a voltage generated by a secondary winding of the second transformer in the ON period of the first or second switching element and provide a second output voltage;
   a feedback circuit configured to compare the first output voltage with a first reference voltage to generate as a first error voltage, and to compare the second output voltage with a second reference voltage to generate as a second error voltage;

a control circuit configured to control an ON period of the first switching element according to a difference of the first error voltage and the second error voltage and control an ON period of the second switching element according to a difference of the second error voltage and a third reference voltage wherein if the second output voltage exceeds the third reference voltage regardless of the first output voltage, the control circuit limits the ON period of the first switching element to shorter than an ON period determined for the first switching element according to a difference of the first error voltage and the second error voltage.

4. A multiple-output switching power source apparatus comprising:

first and second switching elements connected in series between electrodes of a DC power source;

a first series resonant circuit being connected in parallel with the first switching element and including a primary winding of a first transformer and a first current resonant capacitor;

a first rectifying-smoothing circuit configured to rectify and smooth a voltage generated by a secondary winding of the first transformer in an ON period of the first or second switching element in a reverse phase manner to the primary winding of the first transformer and provide a first output voltage;

a second series resonant circuit being connected in parallel with the first switching element and including a primary winding of a second transformer and a second current resonant capacitor, the capacity of the second current resonant capacitor being smaller than that of the first current resonant capacitor;

a second rectifying-smoothing circuit configured to rectify and smooth a voltage generated by a secondary winding of the second transformer in the ON period of the first or second switching element and provide a second output voltage;

a feedback circuit configured to compare the first output voltage with a first reference voltage to generate as a first error voltage, and to compare the second output voltage with a second reference voltage to generate as a second error voltage;

a control circuit configured to control an ON period of the first switching element according to the first error voltage and the second error voltage and control an ON period of the second switching element according to the second error voltage and a third reference voltage wherein if the second output voltage, wherein if the second output voltage exceeds the third reference voltage regardless of the first output voltage, the control circuit limits the ON period of the first switching element to shorter than an ON period determined for the first switching element according to the first error voltage and the second error voltage.

5. The multiple-output switching power source apparatus according to claim 1, wherein a voltage is generated at the secondary winding of the first transformer in a reverse phase manner to the primary winding of the first transformer;

a voltage is generated at the secondary winding of the second transformer in a reverse phase manner to the primary winding of the second transformer; and the capacity of the second current resonant capacitor is smaller than that of the first current resonant capacitor.

\* \* \* \* \*